(No Model.)
A. TINNERHOLM.
ELECTRIC SOLDERING IRON AND HEATER.
No. 500,681. Patented July 4, 1893.
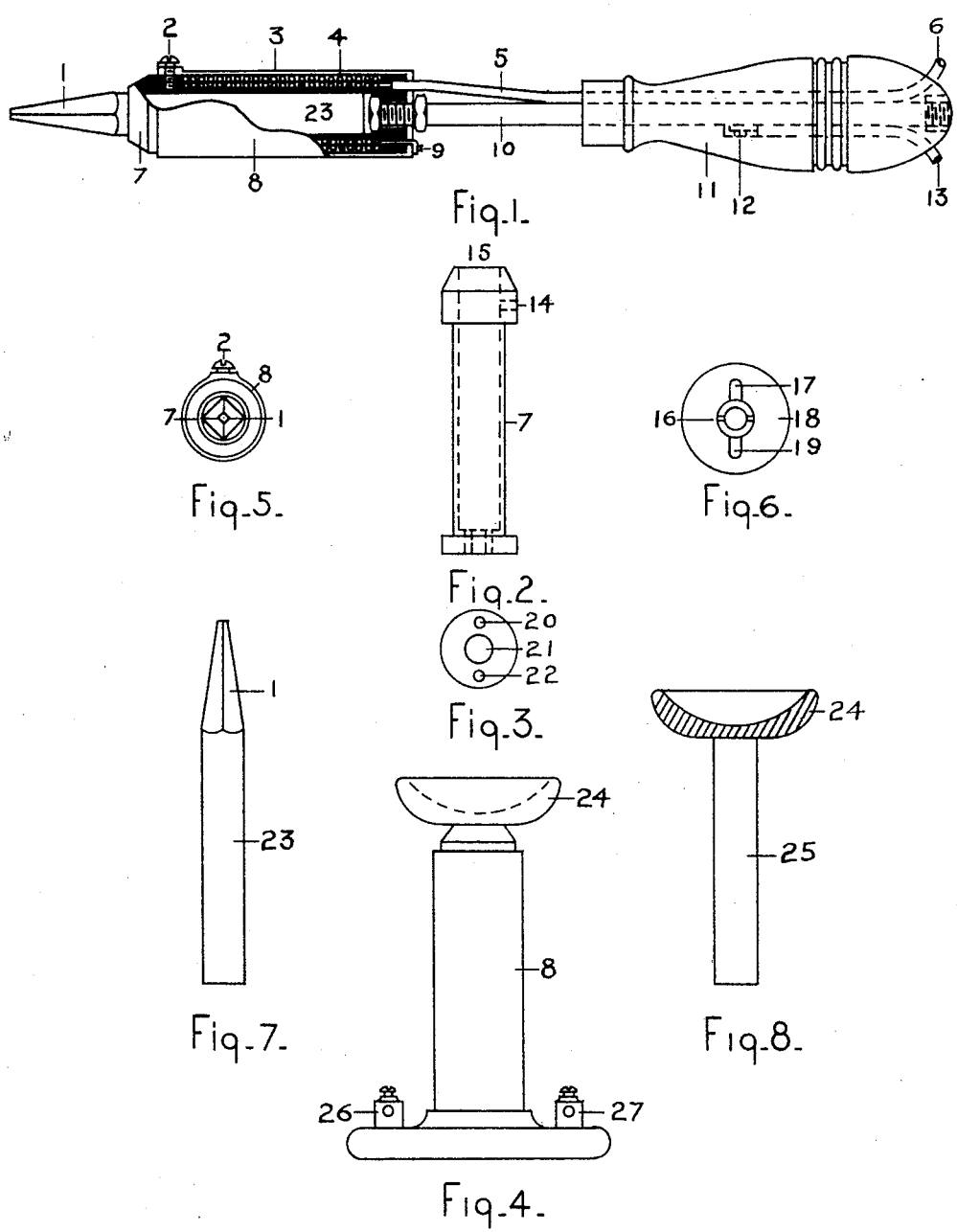

UNITED STATES PATENT OFFICE.

AUGUST TINNERHOLM, OF SCHENECTADY, NEW YORK.

ELECTRIC SOLDERING-IRON AND HEATER.

SPECIFICATION forming part of Letters Patent No. 500,681, dated July 4, 1893.

Application filed July 11, 1892. Serial No. 439,658. (No model.)

*To all whom it may concern:*

Be it known that I, AUGUST TINNERHOLM, a citizen of the United States, residing at Schenectady, in the county of Schenectady and State of New York, have invented a new and useful Electric Soldering-Iron and Heater, of which the following is a specification.

My invention relates to improvements in soldering irons and heaters operated by the heating of wires by an electric current; and the objects of my improvement are, first, to provide a cheap and practical soldering iron or heater that can be used continually, and second, to so construct the same that the tips can be readily replaced or different shaped tips can be used therein without disturbing any of the other parts of the mechanism. I attain these objects by the mechanism illustrated in the accompanying drawings—in which—

Figure 1 is a view partly in section of my invention as it is applied to soldering irons. Fig. 2 is a side view of the insulating spool. Fig. 3 is a view of the insulating spool looking at Fig. 2 from below. Fig. 4 is a side view of my invention arranged as a heater. Fig. 5 is an end view of Fig. 1 looking from the left. Fig. 6 is an end view of Fig. 1 looking from the right. Fig. 7 is a side view of the tip for the soldering iron. Fig. 8 is a side view of the cup for the heater partly in section.

Similar letters refer to similar parts throughout the several views.

The essential feature of my invention is the method of winding the conducting wires upon a non-combustible and porous spool, the spool having a central opening into which the detachable tip to be heated can be inserted.

In Fig. 1, 7 is the spool made of such material as lava, unglazed porcelain, firebrick, &c., upon which is wound several layers of wire 3 each convolution of which is separated from the next in winding, and each layer of which is separated and insulated from the next one with asbestus paper, mica, or similar material. The ends of the wires are brought out of the spool through the holes 20 and 22 Fig. 3. This spool 7 is incased in a metal sleeve or cover 8, one end of which is closed, with holes therein to allow the wires to pass through and also the stem 10 to which the handle is fastened. The stem 10 is threaded at the end and the cover 8 and spool 7 are held in place between two nuts run up on the threaded end of the stem. The handle 11 is held in place on the stem 10 by means of the threaded collar 16 Fig. 6 and a pin passing through the ferrule on the handle and the stem 10. The handle 11 is so recessed out that the wires 6 and 13 come out of the same at the end. The wire 5, 6 goes entirely through the handle from the spool 7 while the wire 13 is connected to the stem 10 on the inside of the handle 11. One end of the wire 3 on the spool 7 is connected to the cover 8 by means of a screw 9 as shown. The cover 8 is reinforced on the upper side at the end to allow the screw 2 to be threaded therein. The screw 2 passes through the hole 14 Fig. 2 in the sleeve and holds the tip 1, 23 in place, which is slipped into the opening 15 Fig. 2 and can have any shaped end required for the purpose for which it is used.

Fig. 4 shows a slight modification of my invention as applied to a heater for melting solder for dipping the ends of wires therein. The shell or cover 8 and spool 7 are the same as described above; the difference in the other parts lies in the base 28 and cup 24. The wires on the spool 7 are brought out to binding posts 26 and 27. The shank 25 Fig. 8 has a cup at the upper end to receive and hold the solder or whatever is to be melted. The parts shown in Figs. 7 and 8 can be made of any metal although copper is preferable on account of its high conductivity of heat. The spool 7 I construct of a porous non-combustible substance for the purpose of absorbing or storing up heat which is given off when needed and equalizes the temperature of the tip 1, 23 or cup 24. To protect the device from the action of acids or other injurious agents I can cover the entire body of the soldering iron or heater with porcelain enamel in such a way that the wires are incased in an air-tight compartment. This is not always desirable or necessary, however, and I do not wish therefore to restrict myself altogether to this construction.

Having described my invention so that any one skilled in the art to which it pertains can make the same, what I claim as my invention, and wish to cover by Letters Patent, is—

1. An electric soldering iron consisting of a spool of porous, non-combustible material having wound thereon a number of turns of conducting wire, said spool being provided with a detachable metal shank placed therein to be heated.

2. In an electrical soldering iron the combination of the spool (7) having wound thereon the wire (3), a detachable shank (1) inserted in said spool, a covering or casing (8) inclosing the winding and covering or layer of enamel on said covering or casing.

3. An electric soldering iron or heater consisting of a spool of wire, said spool being hollow and having therein a shank or tip to be heated, the said spool being incased in a metal cover, the cover and spool being covered on the outside with enamel for the purpose described.

AUGUST TINNERHOLM.

Witnesses:
 HENRY PRICE BALL,
 A. WEBER.